Patented Oct. 31, 1922.

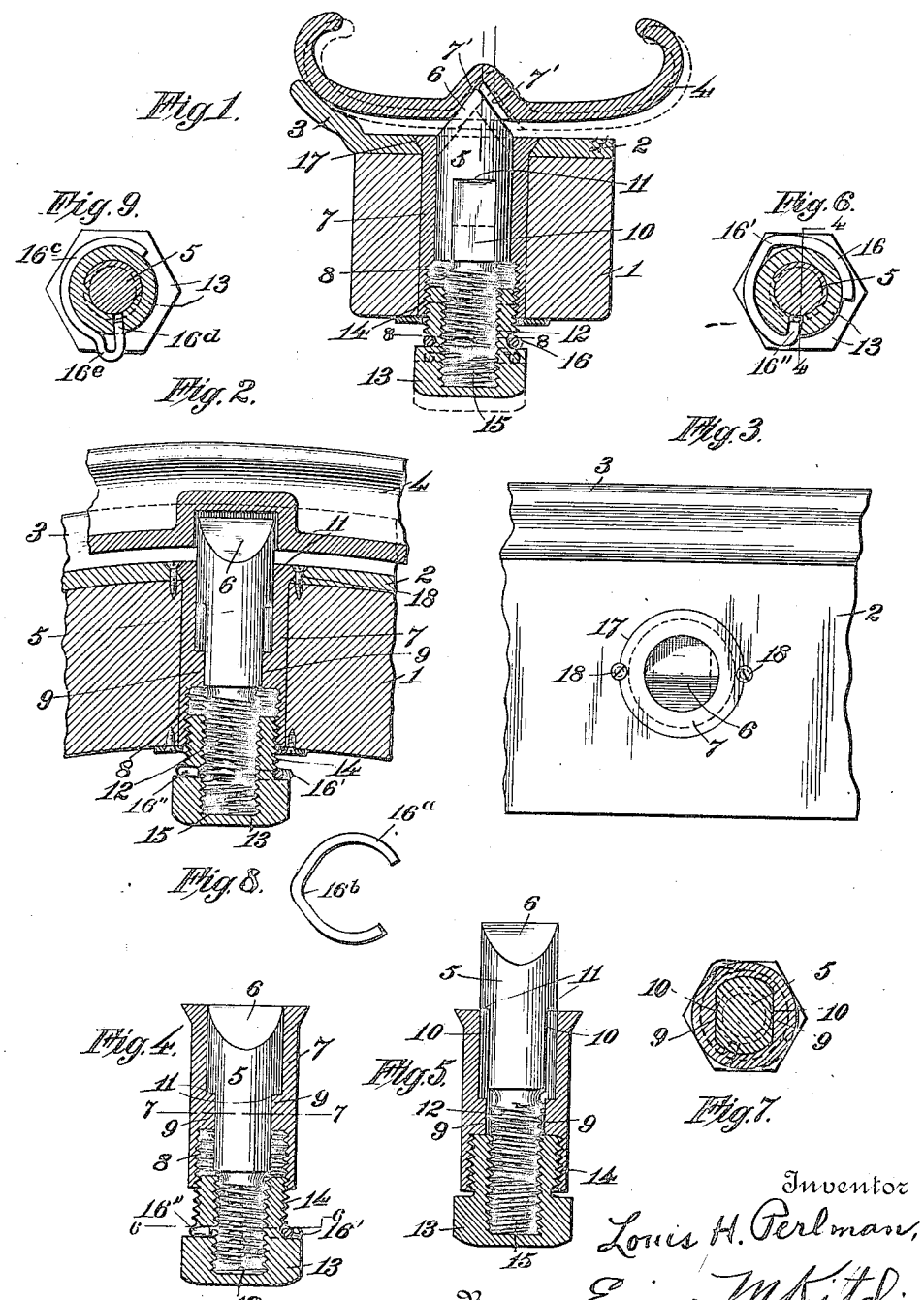

1,434,223

UNITED STATES PATENT OFFICE.

LOUIS H. PERLMAN, OF NEW YORK, N. Y., ASSIGNOR TO GENERAL MOTORS CORPORATION, A CORPORATION OF DELAWARE.

WHEEL.

Application filed September 29, 1919. Serial No. 327,143.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels of the type employed as carrier wheels for automobiles, and appertains more particularly to the demountable rim retaining and locking mechanism thereof.

Among the objects in view are the increasing of the facility and efficiency of demountable rim locking devices, the decreasing of the liability of loss of parts, and the obtaining of the greatest possible simplicity in the construction and operation of the parts.

With these and further objects in view as will in part hereinafter become apparent and in part be stated, the invention comprises certain novel constructions, combinations and arrangements of parts as subsequently specified and claimed.

In the accompanying drawings,—

Figure 1 is a transverse section through the peripheral portion of a wheel embodying the features of the present invention, the down lines being omitted for clearness of disclosure, and parts being seen in elevation.

Figure 2 is a vertical, central section therethrough, parts being seen in elevation.

Figure 3 is a plan view of the parts seen in Figure 2 with the demountable rim removed.

Figure 4 is a longitudinal, central section through the shaft casing of one of the locking devices, the locking shaft being seen in elevation in its maximum withdrawn position.

Figure 5 is a similar view of the same but with the locking shaft in its intially introduced or maximum projected position, which position is attainable only in the absence of the operating-nut-retaining washer.

Figure 6 is a transverse section taken on the plane indicated by line 6—6 of Figure 4.

Figure 7 is a similar section taken on the plane indicated by line 7—7 of Figure 4.

Figure 8 is a plan view of a modified embodiment of the operating-nut-retaining washer detached.

Figure 9 is a view similar to Figure 6 including a slightly different embodiment of the operating-nut-retaining washer.

Referring to the drawings by numerals, 1 indicates the wood felly of an ordinary automobile wheel provided with the usual fixed rim or felly band 2 having the customary annular stop flange 3. These parts represent the peripheral portion of the usual wheel body of an automobile wheel. A demountable rim 4 of any of the well known types is mounted on the wheel body and arranged to have its inner edge engage the stop flange 3, its outer portion being sustained on the wheel by locking devices, each consisting of a wedge and an actuator therefor connecting the wedge to the wheel body. The number of locking devices employed may vary according to the size and work to be done by the wheel, and are spaced substantially uniformly apart about the wheel as is customary with wedge-locking devices for demountable rims. Only one such locking device is shown in the drawing, since the showing of any other of these devices would merely involve duplicate disclosure. This locking device consists of a radially-disposed bolt-like shaft 5 slidingly mounted through the felly and felly band, and having its outer end tapered to wedge shape as seen at 6.

The rim 4 is formed with a depression in its inner face for each wedge 6, the depression being shaped to present inclined walls 7, 7, one of which is designed to be engaged by one of the inclined faces of the wedge 6. The contacting faces are those which may be called the inner faces since they are nearer that face of the wheel which is usually referred to as the inner face since it is next to the vehicle. The shaft 5 is slidingly mounted in a casing or sleeve 7 which has its outer portion cylindrically bored, its inner portion threaded at 8, and intermediate fillets at 9, 9, presenting short flat portions toward the shaft 5. The shaft 5 is flattened for a portion of its length at 10, 10, to correspond with the inward projections or fillets 9, so that the shaft may slide between the said fillets. The flattened portions 10 are preferably produced by cutting away the material of the shaft 5, leaving at the outer portion of the shaft diametrically-opposed shoulders 11, 11. These flattened portions may be otherwise produced, if desired. The inner portion of the shaft 5 is reduced, formed cylindrical, and threaded at 12, the diameter of the threaded portion 12 being less than the distance between the inner faces of the fillets 9. An operating sleeve nut 13 is arranged at the inner end of each casing or sleeve 7, and is externally threaded at 14 to correspond with and engage the threaded portion 8 of the respective sleeve 7. The nut 13 has an axial bore internally threaded at 15, adapted to engage the threads 12 of shaft 5. The threads 12 and 15 are of the same size and number per inch as the threads 8 and 14, but are set at the opposite angle so that, for example, threads 8 and 14 are right-hand threads while the threads 12 and 15 are left-hand threads. Of course, the opposite arrangement of threads, that is, left-hand threads for 8 and 14 and right-hand threads for 12 and 15 may be employed, but are not preferable because the operation of the operating sleeve nut 13 would then be reverse to the natural operation.

The parts of shaft 5 are carefully proportioned so that the shoulders 11 will contact with the upper edges of fillets 9 before the operating nut 13 can be completely unscrewed from sleeve 7. Hence the nut 13 cannot be accidentally lost or removed under conditions where it is liable to be lost. Initially the parts are assembled by placing them in the position indicated in Figure 5 and threading the shaft 5 down until the flat portions 10 engage the flat faces of fillets 9. Further rotation of the shaft becomes impossible and the shaft may then be drawn further down or inward (down being employed to indicate the movement when the locking device is at the highest point of the wheel) by rotation of the operating nut 13 toward the left, that is, contra-clockwise, until the parts assume the position indicated in Figure 4. A washer 16 is then snapped over the shank of nut 13 so as to lie between the shoulder of the nut at the terminus of threads 14 and the end of the sleeve 7, whereby the nut cannot be returned to the position seen in Figure 5 until the washer is removed. The type of washer 16 is susceptible of wide variation, the principal object being to provide an obstruction which while susceptible of removal when desired will remain with sufficient permanency not to become dislocated in use and will form an obstruction preventing the nut from being moved to its uppermost or radially outermost position. It is also desirable to have the washer 16 so constructed as to be susceptible of easy removal without danger of accidental dislocation. The shaft 5 and nut 13 are thus effectively prevented from disconnection or removal from their operative relation to the sleeve during use, but may be easily disconnected after washer 16 has been removed from nut 13. Washer 16 is shown as formed of spring wire with a laterally extended loop 16' in its length and an inturned end portion 16'' at one end to extend into an appropriate recess or aperture in the shank of nut 13. Hooked end 16'' prevents shifting of the washer about the shank of the nut, and loop 16' is adapted to receive the end of a prying instrument, such as an ordinary punch, so as to facilitate easy springing of the washer from the nut when desired. A slightly modified form of this washer is shown in Figure 8, wherein the washer $16^a$ has the tool-receiving loop $16^b$ but is not provided with a bent or hooked end. In Figure 9 is shown a further modified form of the washer wherein the body portion $16^c$ of the washer conforms generally with that of the other washers shown except that the intermediate loop is omitted and in lieu thereof a loop $16^e$ is provided at the end portion of the washer terminating in the shank $16^d$, which shank functions the same as the hooked end 16''. Obviously, in removing the washer $16^c$ the operating or prying tool is inserted into the loop $16^e$.

Sleeve 7 is provided at its outer end with an annular flange 17, preferably beveled, and the felly band 2 and felly 1 are radially bored to accommodate the sleeve 7, the felly band being reamed out to accommodate the flange 17. The sleeve with its locking device is placed within the bore and secured in place by wood screws 18, 18, passed partly through the material of the flange 17 and partly through the material of felly band 2.

In operation, the rim 4 is placed on the wheel body substantially in the position indicated in dotted lines in Figure 1, the several locking wedges 6 being withdrawn to substantially the position indicated in Figure 4, during the application of the rim, and being then projected to the position indicated in full lines in Figure 1, whereby contact of the two inclined engaging faces at the point of each locking device causes the demountable rim to shift from substantially the position indicated in dotted lines to substantially the position indicated in full lines. It will be noted that when the operating nut 13 is revolved to the right, that is clockwise, the threaded portion 14 will be threaded into the threads 8 and thus cause the operating nut 13 to move in a radially outward direction. At the same time, the left-hand threads 12 and 15 back off with respect to each other and thus give the shaft 5 an additional radially outward thrust, so that the outward travel of the shaft 5 is double in distance and speed to that of nut 13. When the nut 13 of each of the several locking devices has been screwed up as far as it will go, the rim 4 is effectively locked in position and ready for use.

What I claim is:—

1. In a locking device for the demountable rim of a wheel, the combination with a sleeve adapted to be embedded in the peripheral portion of the wheel and having an internal bore, one end portion of which is cylindrical and the other end portion threaded, the sleeve having an intermediate flat portion between the cylindrical and threaded portions of its bore and the flat portion terminating in a shoulder facing toward the cylindrical portion of the bore, a rim locking shaft having a cylindrical portion adapted to fit within the cylindrical bore of the sleeve, said shaft having a flat portion corresponding with and adapted to slide along the intermediate flat portion of the sleeve and the shaft having a shoulder at the terminus of its flat portion facing the first mentioned shoulder, and the shaft having a threaded shank beyond the flat portion of a diameter sufficiently less than the diameter of the cylindrical portion for enabling the threaded shank to move past the flat portion of the sleeve, the thread of the shank being of opposite pitch with respect to the thread of the sleeve, and a sleeve nut internally and externally threaded and having its external threads adapted to engage the threads of the sleeve and its internal threads adapted to engage the threads of the shank.

2. In a locking device for the demountable rim of a wheel, the combination with a sleeve adapted to be embedded in the peripheral portion of the wheel and having an internal bore, one end portion of which is cylindrical and the other end portion threaded, the sleeve having an intermediate flat portion between the cylindrical and threaded portions of its bore and the flat portion terminating in a shoulder facing toward the cylindrical portion of the bore, a rim locking shaft having a cylindrical portion adapted to fit within the cylindrical bore of the sleeve, said shaft having a flat portion corresponding with and adapted to slide along the intermediate flat portion of the sleeve and the shaft having a shoulder at the terminus of its flat portion facing the first mentioned shoulder and the shaft having a threaded shank beyond the flat portion of a diameter sufficiently less than the diameter of the cylindrical portion for enabling the threaded shank to move past the flat portion of the sleeve, the thread of the shank being of opposite pitch with respect to the thread of the sleeve, and a sleeve nut internally and externally threaded and having its external threads adapted to engage the threads of the sleeve and its internal threads adapted to engage the threads of the shank, the parts being proportioned to enable the shaft to be revolved within the cylindrical portion of the sleeve sufficiently for causing the threaded shank to be partially screwed into the sleeve nut while the sleeve nut is partially screwed into the sleeve and being limited in the extent to which the shank may be threaded into the sleeve nut by the contacting of the flat portion of the shaft with the flat portion of the bore of the sleeve, the contacting of such flat portions being adapted to prevent further revolution of the shaft while leaving the shaft free to be reciprocated by movement of the nut.

3. In a locking device for the demountable rim of a wheel, the combination with a sleeve adapted to be embedded in the peripheral portion of the wheel and having an internal bore, one end portion of which is cylindrical and the other end portion threaded, the sleeve having an intermediate flat portion between the cylindrical and threaded portions of its bore and the flat portion terminating in a shoulder facing toward the cylindrical portion of the bore, a rim locking shaft having a cylindrical portion adapted to fit within the cylindrical bore of the sleeve, said shaft having a flat portion corresponding with and adapted to slide along the intermediate flat portion of the sleeve and the shaft having a shoulder at the terminus of its flat portion facing the first mentioned shoulder, and the shaft having a threaded shank beyond the flat portion of a diameter sufficiently less than the diameter of the cylindrical portion for enabling the threaded shank to move past the flat portion of the sleeve, the thread of the shank being of opposite pitch with respect to the thread of the sleeve, a sleeve nut internally and externally threaded and having its external threads adapted to engage the threads of the sleeve and its internal threads adapted to engage the threads of the shank, the parts being proportioned to enable the shaft to be revolved within the cylindrical portion of the sleeve sufficiently for causing the threaded shank to be partially screwed into the sleeve nut while the sleeve nut is partially screwed into the sleeve, and being limited in the extent to which the shank may be threaded into the sleeve nut by the contacting of the flat portion of the shank with the flat portion of the bore of the sleeve, the contacting of such flat portions being adapted to prevent further revolution of the shaft while leaving the shaft free to be reciprocated by movement of the nut, and means interposed after the assemblage of the parts between a portion of the nut and a portion of the sleeve for preventing the nut from being threaded into the sleeve a distance sufficient to enable the shaft to move beyond the point where the flat surfaces are in contact.

4. In a locking device for the demountable rim of a wheel, the combination with a sleeve adapted to be embedded in the peripheral portion of the wheel and having an internal bore, one end portion of which is cylindrical and the other end portion threaded, the sleeve having an intermediate flat portion between the cylindrical and threaded portions of its bore and the flat portion terminating in a shoulder facing toward the cylindrical portion of the bore, a rim locking shaft having a cylindrical portion adapted to fit within the cylindrical bore of the sleeve, said shaft having a flat portion corresponding with and adapted to slide along the intermediate flat portion of the sleeve and the shaft having a shoulder at the terminus of its flat portion facing the first mentioned shoulder, and the shaft having a threaded shank beyond the flat portion of a diameter sufficiently less than the diameter of the cylindrical portion for enabling the threaded shank to move past the flat portion of the sleeve, the thread of the shank being of opposite pitch with respect to the thread of the sleeve, and a sleeve nut internally and externally threaded and having its external threads adapted to engage the threads of the sleeve and its internal threads adapted to engage the threads of the shank, the parts being proportioned to enable the shaft to be revolved within the cylindrical portion of the sleeve sufficiently for causing the threaded shank to be partially screwed into the sleeve nut while the sleeve nut is partially screwed into the sleeve and being limited in the extent to which the shank may be threaded into the sleeve nut by the contacting of the flat portion of the shaft with the flat portion of the bore of the sleeve, the contacting of such flat portions being adapted to prevent further revolution of the shaft while leaving the shaft free to be reciprocated by movement of the nut, the sleeve nut having a shank portion and a head radially inward of the shank portion, and a washer applied to the shank of the sleeve nut between its head and the contiguous end of the sleeve after the assemblage of the parts for preventing the nut from being threaded into the sleeve a distance sufficient to enable the shaft to move beyond the point where the flat surfaces are in contact.

5. In a locking device for the demountable rim of a wheel, the combination of detachably connected shiftable locking members adapted to be projected and retracted, and a washer detachably engaging one of said members for limiting the extent of projection sufficiently for preventing disconnection of the members the washer being of the split type and of spring material and formed with a laterally outstanding loop.

6. In a locking device for the demountable rim of a wheel, the combination of detachably connected shiftable locking members adapted to be projected and retracted, and a washer detachably engaging one of said members for limiting the extent of projection sufficiently for preventing disconnection of the members, the washer being of the split type and of spring material and having a laterally extending end portion adapted to interlock in a recess in one of the locking members.

7. In a locking device for the demountable rim of a wheel the combination of detachably connected shiftable locking members adapted to be projected and retracted, and a washer detachably engaging one of said members for limiting the extent of projection sufficiently for preventing disconnection of the members, the washer being of the split type and of spring material and being formed with a loop at its terminal portion ending in a projecting shank adapted to extend into a recess in one of the locking members.

In testimony whereof I affix my signature in presence of two witnesses.

LOUIS H. PERLMAN.

Witnesses:
  E. M. FREEHLING,
  E. M. KITCHIN.